(12) United States Patent
Kim et al.

(10) Patent No.: US 11,299,145 B2
(45) Date of Patent: Apr. 12, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Eungseo Kim, Suwon-si (KR); DongHyun Sung, Hwaseong-si (KR); Jonghyeok Park, Seosan-si (KR); Sangmin Lee, Seoul (KR); Tae Young Lee, Yongin-si (KR); Junghyun Kim, Seoul (KR); Seung Hoon Jeon, Incheon (KR); Yongseok Kwon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 243 days.

(21) Appl. No.: 16/139,668

(22) Filed: Sep. 24, 2018

(65) Prior Publication Data

US 2019/0283739 A1 Sep. 19, 2019

(30) Foreign Application Priority Data

Mar. 19, 2018 (KR) .......................... 10-2018-0031427

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G01S 13/931* (2013.01);
(Continued)

(58) Field of Classification Search
CPC .... B60W 30/09; B60W 30/956; B60W 10/18; B60W 10/20; B60W 50/14;
(Continued)

(56) References Cited

U.S. PATENT DOCUMENTS 9,539,969 B2 * 1/2017 Crandall ........... B60R 21/01526
9,701,307 B1 * 7/2017 Newman ............. B60W 10/184
(Continued)

FOREIGN PATENT DOCUMENTS

JP        2015-101240 A    6/2015
KR  10-2012-0140559 A   12/2012
(Continued)

OTHER PUBLICATIONS

NHSTA, Sheldon L. Stucki, Determination of Frontal Offset Test Conditions Based on Crash Data, 1998, Paper No. 98-S1-O-02, Fig. 7 (Year: 1998).*

*Primary Examiner* — Jess Whittington
*Assistant Examiner* — Terry C Buse
(74) *Attorney, Agent, or Firm* — Morgan, Lewis & Bockius LLP

(57) ABSTRACT

A vehicle includes a surrounding information detector detecting at least one of a position and a speed of an object around the vehicle including a vehicle ahead and a vehicle behind, a vehicle information sensor detecting at least one of a speed and an acceleration of the vehicle, a brake module generating a braking force to decelerate the vehicle, and a controller configured to determine probabilities of a forward collision and a rear-end collision based on output of the surrounding information detector and the vehicle information sensor, determine target forward and rear collision speeds to minimize a sum of injuries to an occupant by the forward collision and injuries to the occupant by the rear-end collision upon determination that there is the probabilities of (Continued)

the forward collision and the rear-end collision, and control the brake module based on the target forward collision speed and the target rear-end collision speed.

21 Claims, 18 Drawing Sheets

(51) Int. Cl.
| | |
|---|---|
| *G01S 13/931* | (2020.01) |
| *B60W 10/20* | (2006.01) |
| *B60W 10/18* | (2012.01) |
| *G05D 1/02* | (2020.01) |
| *B60W 50/14* | (2020.01) |
| *B60R 21/00* | (2006.01) |
| *B60R 21/34* | (2011.01) |

(52) U.S. Cl.
CPC ....... *B60R 21/34* (2013.01); *B60R 2021/0004* (2013.01); *B60R 2021/0011* (2013.01); *B60W 10/18* (2013.01); *B60W 10/20* (2013.01); *B60W 50/14* (2013.01); *B60W 2050/146* (2013.01); *B60W 2420/42* (2013.01); *B60W 2420/52* (2013.01); *G05D 1/0238* (2013.01); *G05D 1/0246* (2013.01)

(58) Field of Classification Search
CPC ....... B60W 2050/146; B60W 2420/42; B60W 2420/52; B60W 30/12; B60W 30/095; B60W 30/08; B60W 10/22; B60W 40/114; B60W 40/109; B60W 40/02; B60W 10/01; B60W 50/01; G01S 13/931; B60R 21/34; B60R 2021/04; B60R 2021/11; B60R 21/00; B60R 20/01; B60R 20/00; G05D 1/0238; G05D 1/0246; B62D 6/00; B62D 1/04; B62D 5/481; G08G 1/16; B60Q 1/52
USPC ........................................................ 701/301
See application file for complete search history.

(56) References Cited

U.S. PATENT DOCUMENTS

| | | | |
|---|---|---|---|
| 2005/0010340 A1* | 1/2005 | Peravali | B60R 21/0156 701/32.2 |
| 2010/0214155 A1 | 8/2010 | Harada | |
| 2012/0130629 A1 | 5/2012 | Kim | |
| 2014/0379167 A1* | 12/2014 | Flehmig | B60W 30/0956 701/1 |

FOREIGN PATENT DOCUMENTS

| | | |
|---|---|---|
| KR | 10-2013-0050527 A | 5/2013 |
| KR | 10-1782368 B1 | 10/2017 |

\* cited by examiner

VEHICLE AND METHOD OF CONTROLLING THE SAME

CROSS-REFERENCE TO RELATED APPLICATION(S)

This application claims the benefit of priority to Korean Patent Application No. 10-2018-0031427, filed on Mar. 19, 2018 in the Korean Intellectual Property Office, the entire disclosure of which is incorporated herein by reference.

TECHNICAL FIELD

Embodiments of the present disclosure relate to a vehicle capable of detecting a risk of collision of the vehicle in all directions and a method of controlling the same.

BACKGROUND

A Forward Collision Avoidance Assist system is a system that determines a risk of collision with a vehicle ahead, a pedestrian, a bicycle, and other obstacles by using output values of sensors installed in a vehicle, and performs automatic braking simultaneously providing a driver with a warning of a risk of collision when there is a risk of collision.

Safety of the vehicle may be improved by the forward collision avoidance assist system since a risk of forward collision is efficiently dealt with even when a driver cannot recognize the risk of forward collision or fails to react thereto.

SUMMARY

Therefore, it is an aspect of the present disclosure to provide a vehicle capable of preventing damage caused by a rear-end collision with a vehicle behind while decelerating to avoid a forward collision with a vehicle ahead by controlling a speed of the vehicle in consideration of not only the forward collision with the vehicle ahead but also the rear-end collision with the vehicle behind and a method of controlling the vehicle.

Additional aspects of the disclosure will be set forth in part in the description which follows and, in part, will be obvious from the description, or may be learned by practice of the disclosure.

According to an aspect of the present disclosure, a vehicle includes a surrounding information detector for detecting at least one of a position and a speed of an object around the vehicle including a vehicle ahead and a vehicle behind, a vehicle information sensor for detecting at least one of a speed and an acceleration of the vehicle, a brake module for generating a braking force to decelerate the vehicle, and a controller configured to determine a probability of a forward collision with the vehicle ahead and a probability of a rear-end collision with the vehicle behind based on outputted information of the surrounding information detector and the vehicle information sensor, determine a target forward collision speed and a target rear-end collision speed to minimize a sum of injuries to an occupant of the vehicle by the forward collision and injuries to the occupant by the rear-end collision upon determination that there are the probabilities of the forward collision and the rear-end collision, and control the brake module based on the target forward collision speed and the target rear-end collision speed.

The controller may determine a collision mode based on positions and moving directions of the vehicle and the vehicle ahead upon determination that there is a probability of a forward collision.

The collision mode may include at least one of a same direction collision mode in which the vehicle collides with a vehicle ahead travelling in the same direction at the rear of the vehicle ahead, a head-on collision mode in which the vehicle collides with a vehicle ahead travelling toward the vehicle, and a side collision mode in which the vehicle collides with a vehicle ahead at an intersection.

The controller may acquire injury information by the forward collision indicating injuries to the occupant by the forward collision and injury information by the rear-end collision indicating injuries to the occupant by the rear-end collision.

The acquired injury information by the forward collision may include injury criteria calculated for the forward collision with respect to collision speed of the vehicle, and the acquired injury information by the rear-end collision may include injury criteria calculated for the rear-end collision with respect to collision speed of the vehicle.

The controller may calculate a normalized injury index for the forward collision by using the acquired injury information by the forward collision and calculate a normalized injury index for the rear-end collision by using the acquired injury information by the rear-end collision.

The controller may determine a minimum value of a sum of the normalized injury index calculated for the forward collision and the normalized injury index calculated for the rear-end collision.

The controller may determine a target forward collision speed and a target rear-end collision speed corresponding to the determined minimum value of the sum of the normalized injury index calculated for the forward collision and the normalized injury index calculated for the rear-end collision.

The controller may determine a target acceleration satisfying the target forward collision speed and the target rear-end collision speed.

The controller may calculate a control amount to decelerate the vehicle in accordance with the target acceleration, generate a control signal based on the calculated control amount, and transmit the generated control signal to the brake module.

According to another aspect of the present disclosure, a method of controlling a vehicle includes detecting at least one of a position and a speed of an object around the vehicle including a vehicle ahead and a vehicle behind, detecting at least one of a speed and an acceleration of the vehicle, determining a probability of a forward collision with the vehicle ahead and a probability of a rear-end collision with the vehicle behind based on the at least one of the position and the speed of the object and the at least one of the speed and the acceleration of the vehicle, determining a target forward collision speed and a target rear-end collision speed to minimize a sum of injuries of an occupant of the vehicle by the forward collision and injuries to the occupant by the rear-end collision upon determination that there are the probabilities of the forward collision and the rear-end collision, and performing a braking control of the vehicle based on the target forward collision speed and the target rear-end collision speed.

The determining of the probabilities of the forward collision and the rear-end collision may further include determining a collision mode based on positions and moving directions of the vehicle and the vehicle ahead upon determination that there is a probability of a forward collision.

The collision mode may include at least one of a same direction collision mode in which the vehicle collides with a vehicle ahead travelling in the same direction at the rear of the vehicle ahead, a head-on collision mode in which the vehicle collides with a vehicle ahead travelling toward the vehicle, and a side collision mode in which the vehicle collides with a vehicle ahead at an intersection.

The determining of the target forward collision speed and the target rear-end collision speed may include acquiring injury information by the forward collision indicating injuries to the occupant by the forward collision and injury information by the rear-end collision indicating injuries to the occupant by the rear-end collision.

The acquired injury information by the forward collision may include injury criteria calculated for the forward collision with respect to collision speed of the vehicle, and the acquired injury information by the rear-end collision may include injury criteria calculated for the rear-end collision with respect to collision speed of the vehicle.

The determining of the target forward collision speed and the target rear-end collision speed may further include calculating a normalized injury index for the forward collision by using the acquired injury information by the forward collision and calculating a normalized injury index for the rear-end collision by using the acquired injury information by the rear-end collision.

The determining of the target forward collision speed and the target rear-end collision speed may further include determining a minimum value of a sum of the normalized injury index calculated for the forward collision and the normalized injury index calculated for the rear-end collision.

The determining of the target forward collision speed and the target rear-end collision speed may further include determining a target forward collision speed and a target rear-end collision speed corresponding to the determined minimum value of the sum of the normalized injury index calculated for the forward collision and the normalized injury index calculated for the rear-end collision.

The performing of a braking control of the vehicle may include determining a target acceleration satisfying the target forward collision speed and the target rear-end collision speed.

The performing of a braking control of the vehicle may include calculating a control amount to decelerate the vehicle in accordance with the target acceleration, generating a control signal based on the calculated control amount, and transmitting the generated control signal to the brake module.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
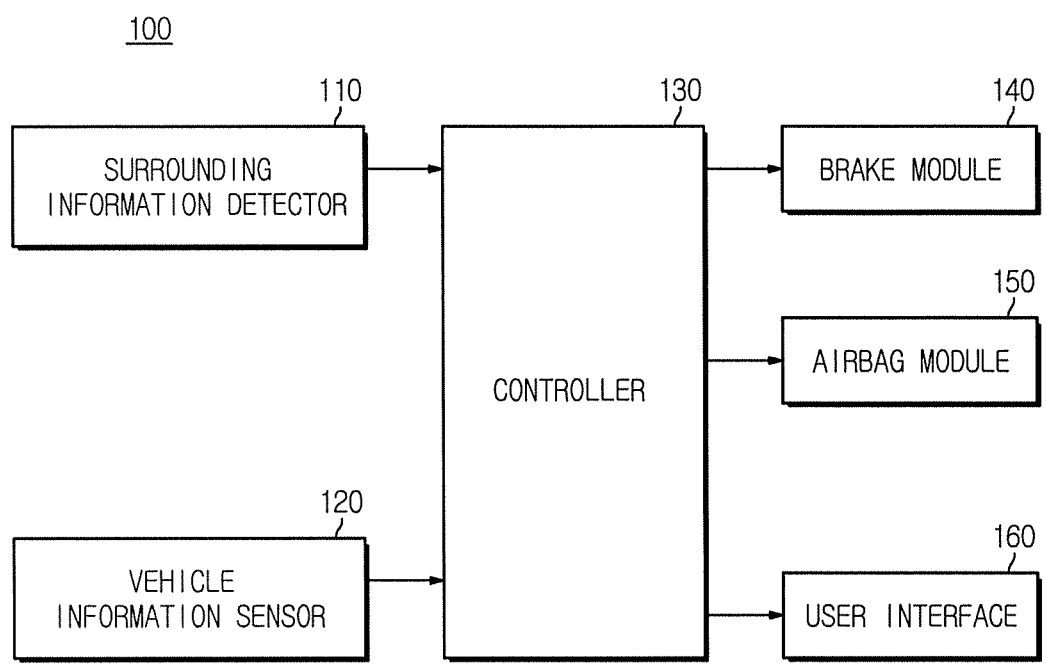
FIG. 1 is a control block diagram of a vehicle according to an embodiment.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted.

Throughout the specification, when an element is referred to as being "connected to" another element, it may be directly or indirectly connected to the other element and the "indirectly connected to" includes connected to the other element via a wireless communication network.

Also, it is to be understood that the terms such as "include", "have", or the like, are intended to indicate the existence of the components disclosed in the specification, and are not intended to preclude the possibility that one or more other components may exist or may be added.

An expression used in the singular encompasses the expression of the plural, unless it has a clearly different meaning in the context.

In addition, the terms "unit", "device," "block", "member", and "module" used herein refer to a unit used to process at least one function or operation. For example, these terms may refer to one or more hardware components such as field-programmable gate array (FPGA) or application specific integrated circuit (ASIC), one or more software components stored in a memory, or one or more processors.

The reference numerals used in operations are used for descriptive convenience and are not intended to describe the order of operations and the operations may be performed in a different order unless otherwise stated.

Hereinafter, a vehicle and a method of controlling the same according to embodiments of the present disclosure will be described in detail with reference to the accompanying drawings.

Figure 2:
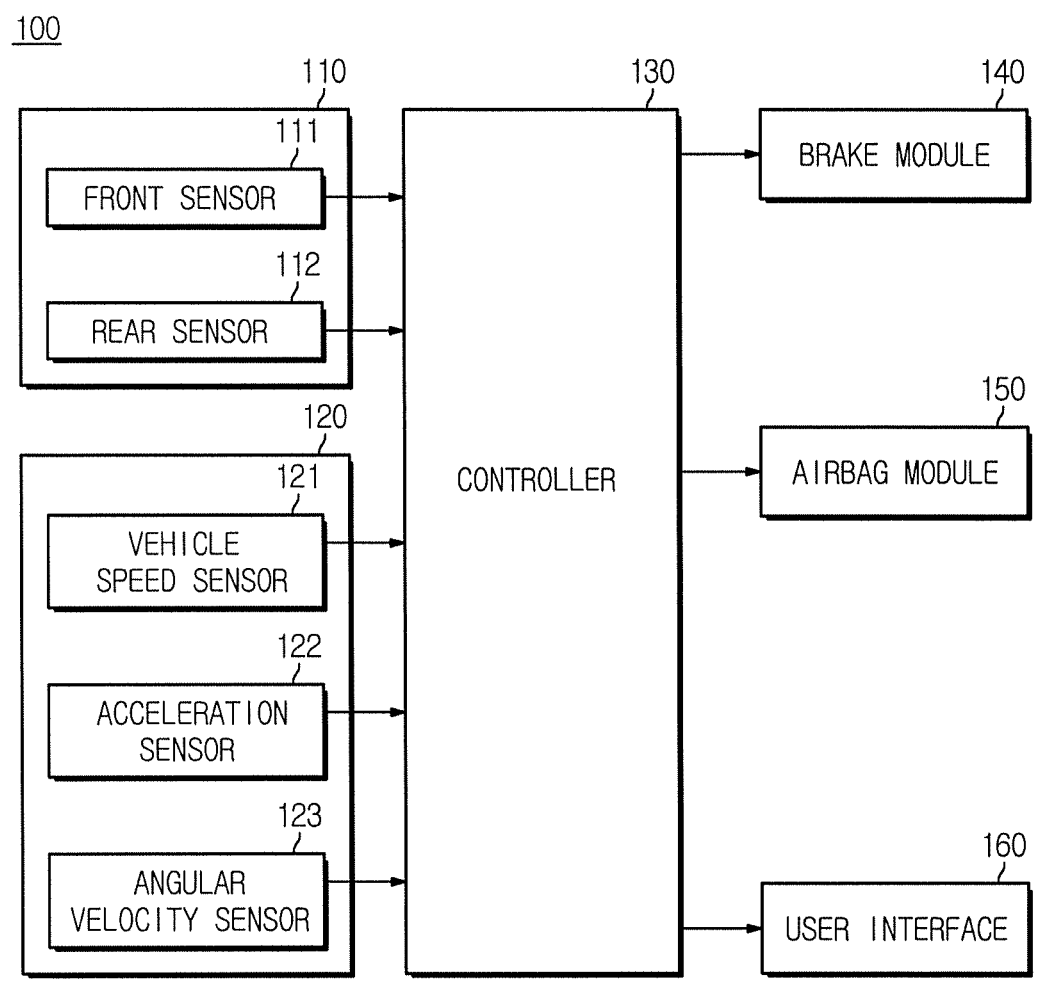
FIG. 2 is a control block diagram exemplarily illustrating sensors included in a vehicle according to an embodiment.
Figure 3:
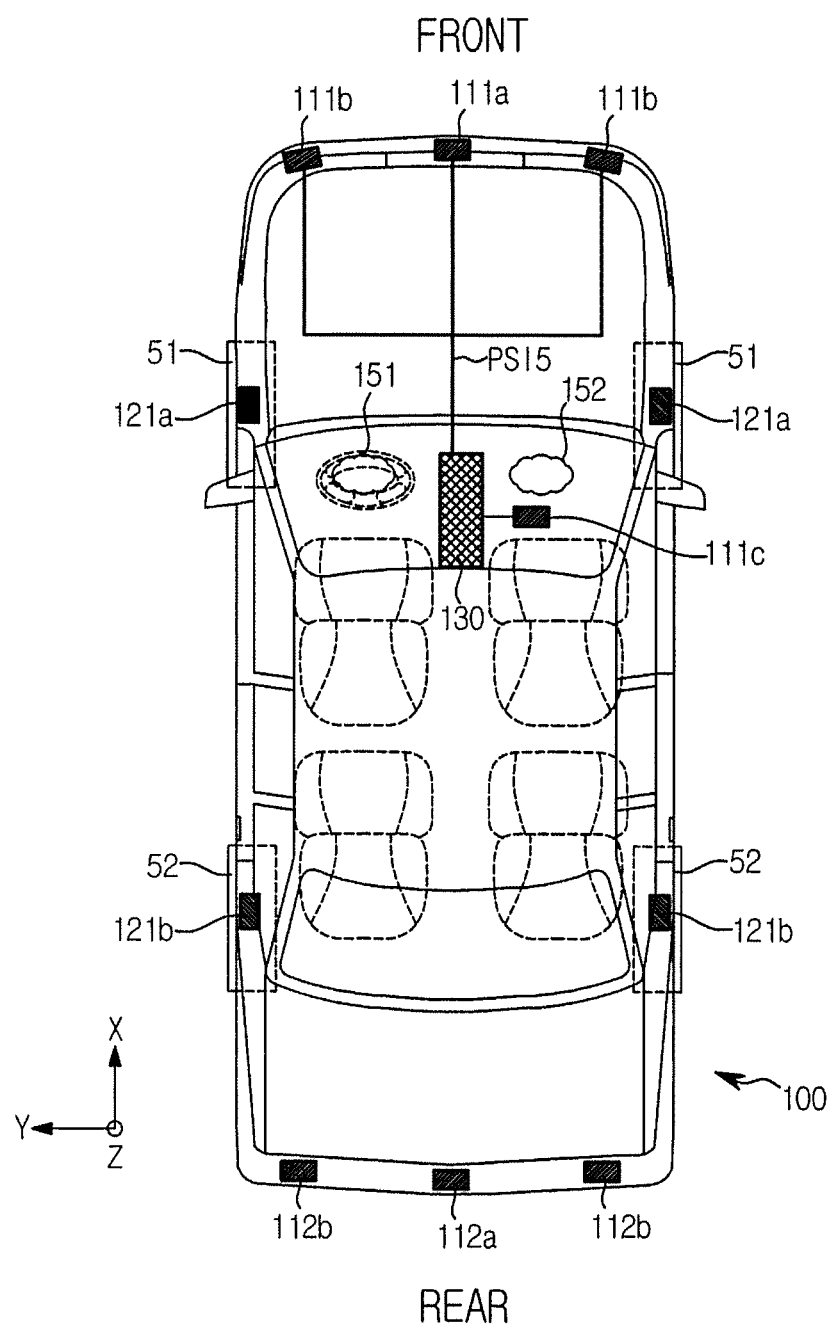
FIG. 3 is a diagram illustrating positions of sensors included in a vehicle according to an embodiment.
Figure 4:
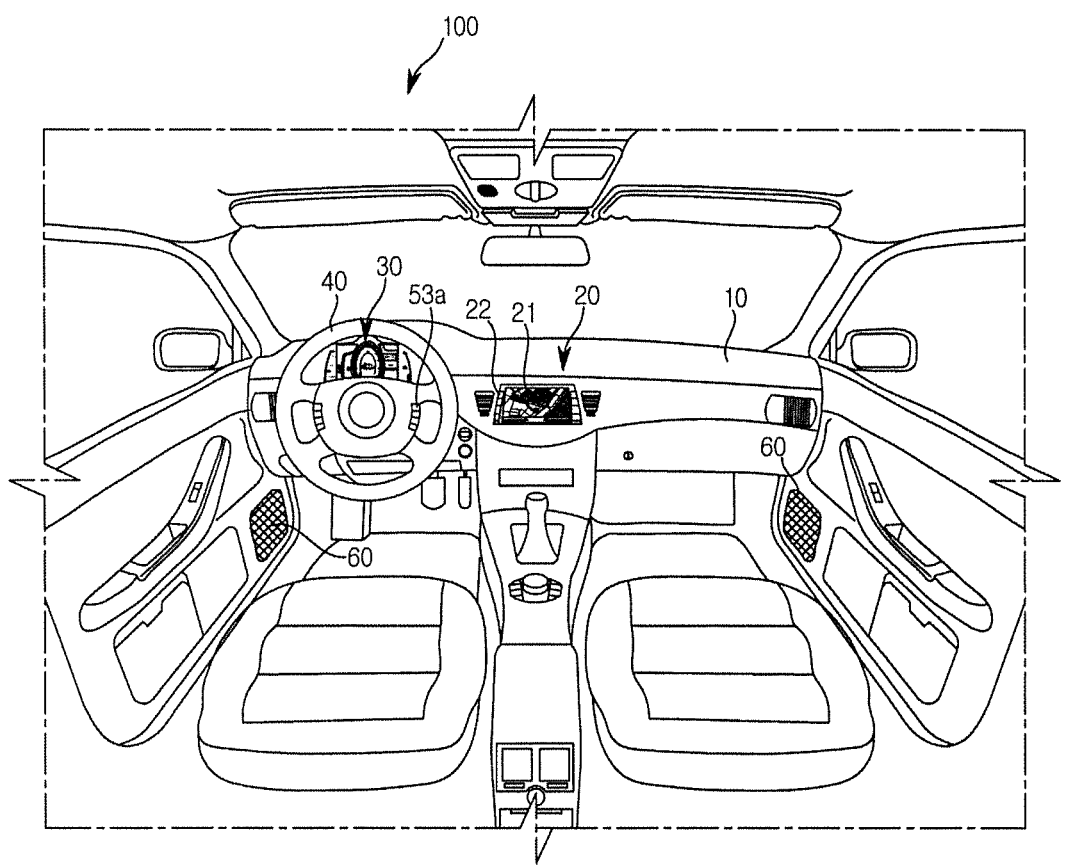
FIG. 4 is a diagram illustrating an internal view of a vehicle according to an embodiment.

FIG. 1 is a control block diagram of a vehicle according to an embodiment. FIG. 2 is a control block diagram exemplarily illustrating sensors included in a vehicle according to an embodiment. FIG. 3 is a diagram illustrating positions of sensors included in a vehicle according to an embodiment. FIG. 4 is a diagram illustrating an internal view of a vehicle according to an embodiment.

Referring to FIG. 1, a vehicle 100 according to an embodiment includes a surrounding information detector 110 configured to acquire information on an object located around the vehicle 100, a vehicle information sensor 120 configured to acquire information on a state of the vehicle 100, a brake module 140 configured to brake the vehicle 100, an airbag module 150 configured to deploy an airbag upon receiving input of an airbag deployment signal, a user interface 160 configured to output a notification or a warning to a user of a risk of collision, and a controller 130 configured to determine the risk of collision of the vehicle 100 based on output of the surrounding information detector 110 and the vehicle information sensor 120, determine a target acceleration to minimize damage caused by a collision when there is the risk of collision, and control at least one of the brake module 140, the airbag module 150, and the user interface 160 in accordance with the risk of collision and the target acceleration.

The surrounding information detector 110 may include at least one of various types of sensors that may recognize an object located around the vehicle 100 and acquire information such as a position of the recognized object or a distance therefrom.

For example, as illustrated in FIG. 2, the surrounding information detector 110 may include a front sensor 111 configured to acquire information on an object located in front of the vehicle 100 and a rear sensor 112 configured to acquire information on an object behind the vehicle 100. The front sensor 111 and the rear sensor 112 may be implemented using at least one of a camera, a radar, and a LIDAR.

For example, the front sensor 111 may include a front radar 111a located at a front central region of the vehicle 100 and front-side radars 111b respectively located at front left and right regions of the vehicle 100 as illustrated in FIG. 3.

The front radar 111a and the front-side radars 111b may sense a distance from a neighboring object and a relative speed thereof by using Doppler frequency shift between transmitted waves and received waves.

In addition, the front sensor 111 may further include a front camera 111c installed to face toward the front of the vehicle 100. The front camera 111c may include a CMOS image sensor or a CCD image sensor.

The rear sensor 112 may include rear-side radars 112b respectively located at rear left and right regions of the vehicle 100 and a rear camera 112a located at a rear central region of the vehicle 100.

The vehicle information sensor 120 may include at least one of various sensors capable of acquiring information on speed or posture of the vehicle 100. Referring back to FIG. 2, the vehicle information sensor 120 may include a vehicle speed sensor 121 configured to sense a speed of the vehicle 100, an acceleration sensor 122 configured to sense an acceleration of the vehicle 100, and an angular velocity sensor 123 configured to sense an angular velocity of the vehicle 100.

Referring to an example illustrated in FIG. 3, the vehicle speed sensor 121 may be implemented using a wheel speed sensor configured to sense a speed of a wheel. The wheel speed sensor may include a front wheel speed sensor 121a configured to sense a speed of front wheels 51 of the vehicle 100 and a rear wheel speed sensor 121b configured to sense a speed of rear wheels 52 of the vehicle 100.

The acceleration sensor 122 (not illustrated) may include a longitudinal acceleration sensor configured to output an acceleration of a height direction, i.e., a Z-axial direction, of the vehicle 100 and a lateral acceleration sensor configured to output an acceleration of a lateral direction, i.e., a Y-axial direction, of the vehicle 100. The longitudinal acceleration sensor and the lateral acceleration sensor may be implemented using separate sensor modules or using one sensor module.

The angular velocity sensor 123 (not illustrated) is a sensor of measuring a posture of the vehicle 100 and is also referred to as a gyro sensor. The angular velocity sensor 123 may include a roll rate sensor measuring a rotational angular velocity around a roll direction of the vehicle 100 and a yaw rate sensor measuring a rotational angular velocity around a yaw direction of the vehicle 100. The roll rate sensor and the yaw rate sensor may be implemented using separate sensor modules or using one sensor module.

The types and positions of the sensors included in the surrounding information detector 110 and the vehicle information sensor 120 described above are merely examples applicable to the vehicle 100 and any other sensors may also be used as well as the afore-mentioned sensors and the sensors may also be installed at any other positions as well as the afore-mentioned positions.

The airbag module 150 may include a driver airbag 151 installed at a steering wheel of a driver's seat and a front passenger airbag 152 installed at a dashboard. In addition, the vehicle 100 may further include a curtain airbag installed at a roof rail and a side airbag installed at each door separately from the curtain airbag.

The airbag module 150 may further include an inflator configured to generate a gas injected into the airbags 151 and 152. An explosive ignition type inflator may include an ignition circuit, an igniter, a gas generator, a gas filter, and the like. When a current flows through the ignition circuit, a gunpowder is burnt. When the igniter is burnt by combustion of the gunpowder, heat is generated and the gas generator is burnt. Nitrogen gas is rapidly generated by the combustion of the gas generator and impurities are removed from the nitrogen gas while nitrogen gas is passing through the gas filter. Thus, nitrogen gas may be introduced into the airbag in a state where the temperature is lowered.

The airbags 151 and 152 may be made of a nylon material. After being inflated by the nitrogen gas introduced from the inflator, the nitrogen gas may be discharged through a discharge hole to prevent the occupants from being pressed by the airbags 151 and 152.

The structure of the airbag module 150 described above is merely an example applicable to the vehicle 100, and any other structures may also be applied thereto.

Data output from the surrounding information detector 110 or the vehicle information sensor 120 may be transmitted to the controller 130 by internal communication protocols of the vehicle 100.

Examples of the communication protocols of the vehicle 100 may include Controller Area Network (CAN), Local Interconnection Network (LIN), Media Oriented Systems Transport (MOST), FlexRay, and Ethernet.

For example, a plurality of electronic control units (ECUs) may transmit a CAN signal to one CAN BUS or request for a required CAN signal. In this regard, each ECU may serve as a node in the CAN communication and the CAN signal may be transmitted in the form of a message.

Data output from the surrounding information detector 110 or the vehicle information sensor 120 may be transmitted to the controller 130 via the CAN BUS, and a control signal output from the controller 130 may be transmitted to the brake module 140, the airbag module 150, or the user interface 160 via the CAN BUS.

However, communication methods of the vehicle 100 are not limited to those described above. Any other communication protocols other than the CAN network may also be used or some of the components may communicate over the CAN network and the other components may communication using any other communication protocols.

For example, Peripheral Sensor Interface 5 (PSIS) may be used for communications between the surrounding information detector 110 or the vehicle information sensor 120 and the controller 130. In addition, a hardwired interface may also be used.

The controller 130 may detect an event such as a rollover and an impact that occurs or is predicted to occur in the vehicle 100 based on output of the surrounding information detector 110 and the vehicle information sensor 120 and may select one of a plurality of airbags 151 and 152 included in the airbag module 150 and a deployment time of the airbag based on the type of the event.

The controller 130 may include at least one non-transitory memory storing programs to perform operations described above and below and at least one processor to execute the stored programs. When the controller 130 includes a plurality of memories and a plurality of processors, the plurality of memories and the plurality of processors may be integrated in one chip or physically separated from each other.

Referring to FIG. 4, a head unit 20 may be provided at a center fascia located at a central region of the dashboard 10 in the vehicle 100. The head unit 20 may process audio signals and video signals and output the processed signals and may also be provided with a navigation module having navigation functions. Thus, the head unit 20 may also be referred to as an Audio Video Navigation (AVN) device.

The head unit 20 may also display the state of the vehicle 100 or receive input of a control command from the user in addition to audio functions, video functions, navigation functions, and phone call functions.

The head unit 20 may include a display 21 configured to display a screen required to perform various functions and an input device 22 configured to receive a control command of the user.

The display 21 may be implemented using any one of various display devices such as a liquid crystal display (LCD), a light emitting diode (LED), a plasma display panel (PDP), an organic light emitting diode (OLED), and a cathode ray tube (CRT).

The input device 22 may be provided in a form of a button or a touch pad around the display 21 or in a form of a touch pad on a front surface of the display 21 to constitute a touch screen.

A cluster 30 that displays driving information, state information, and the like of the vehicle 100 may be provided in front of the steering wheel 40.

The user interface 160 may include at least one of the display 21 and the cluster 30 of the head unit 20. For example, upon determination that there is a risk of collision of the vehicle 100, the controller 130 may inform the user of the risk of collision by outputting a warning screen to the display 21 of the head unit 20 or the cluster 30.

Alternatively, the user interface 160 may include a vibrator provided at the steering wheel 40. In this case, the controller 130 may tactilely notify the user of the risk of collision by outputting a vibration via the vibrator.

Alternatively, the user interface 160 may include a speaker 60. In this case, the controller 130 may audibly inform the user of the risk of collision by outputting a warning message or a warning sound via the speaker 60.

Figure 5:
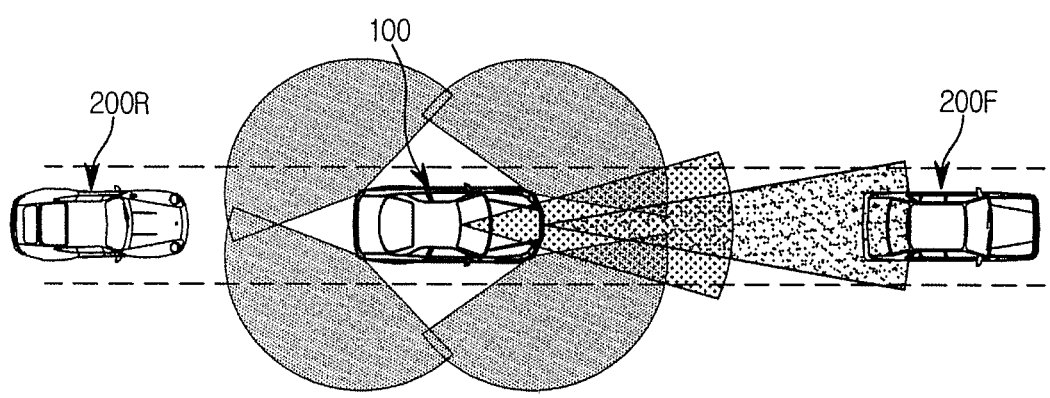
FIG. 5 is a diagram exemplarily illustrating an object sensed while a vehicle according to an embodiment is travelling.
Figure 6:
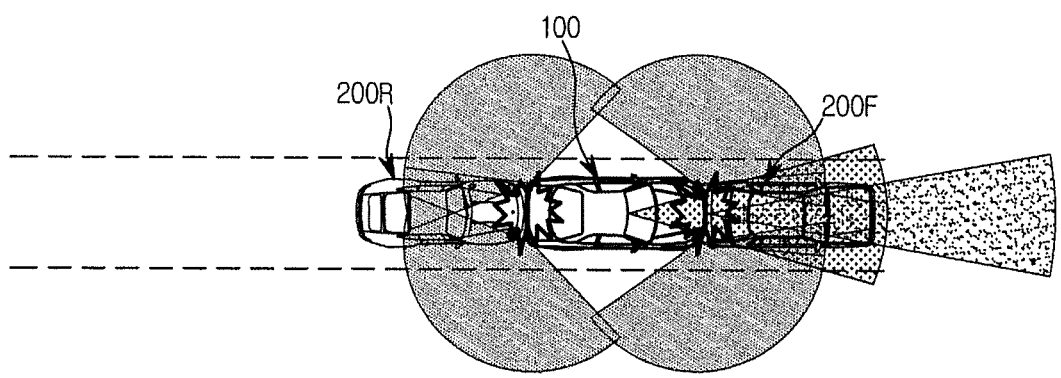
FIGS. 6 to 8 are diagrams exemplarily illustrating collision modes predicted by a vehicle according to an embodiment.
Figure 7:
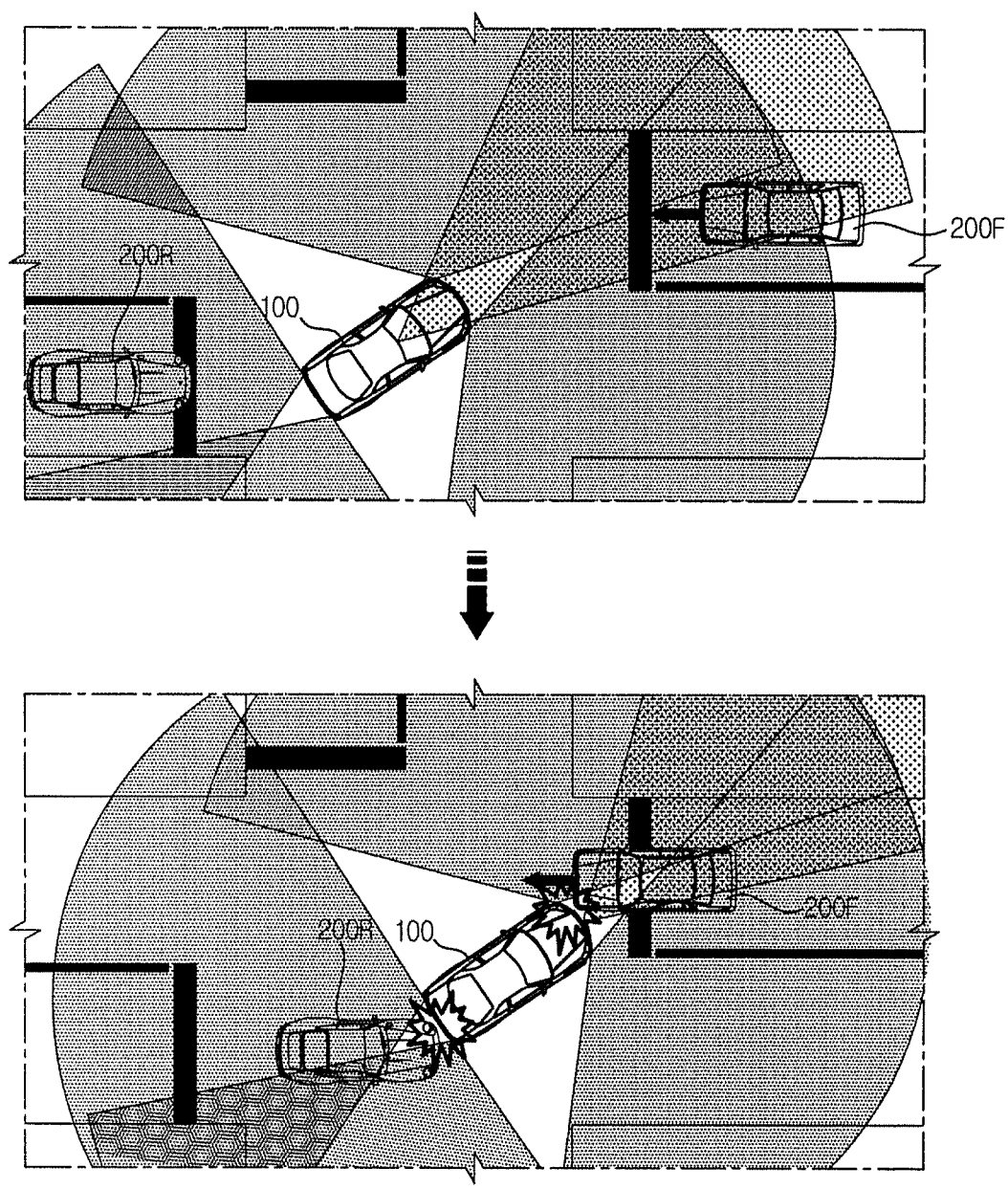
Figure 8:
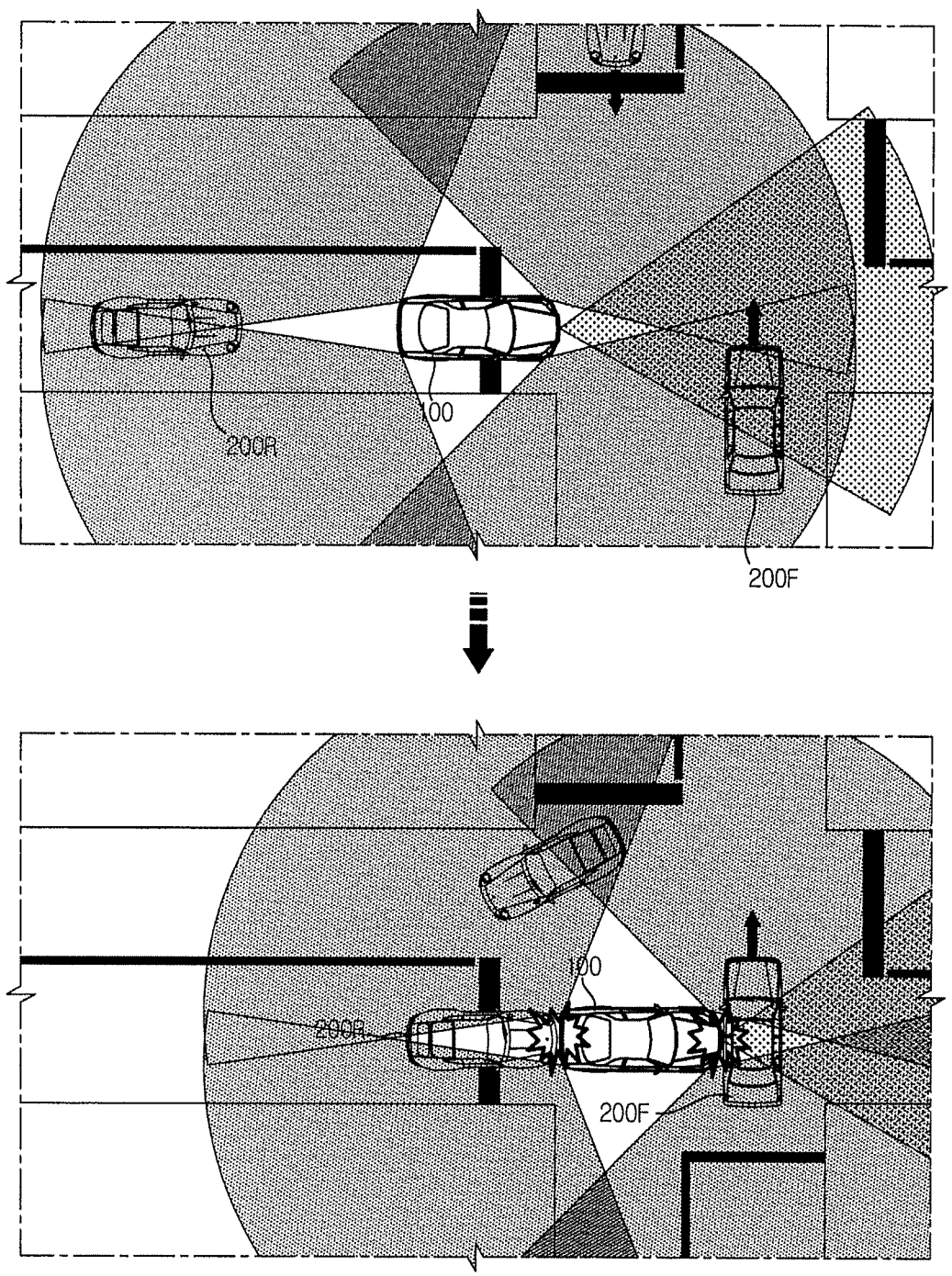

FIG. 5 is a diagram exemplarily illustrating an object sensed while a vehicle according to an embodiment is travelling. FIGS. 6 to 8 are diagrams exemplarily illustrating collision modes predicted by a vehicle according to an embodiment.

Although the object around the vehicle 100 recognized by the surrounding information detector 110 may include all objects that may collide with the vehicle 100 such as another vehicle, a pedestrian, a bicycle, a motorcycle, and an obstacle, another vehicle around the vehicle 100 will be exemplarily described as the object for detailed descriptions of the embodiment.

Referring to FIG. 5, the front sensor 111 may recognize a vehicle ahead 200F travelling in front of the vehicle 100 and the rear sensor 112 may recognize a vehicle behind 200R following behind the vehicle 100. The front sensor 111 and the rear sensor 112 may recognize the vehicle ahead 200F and the vehicle behind 200R when the vehicle ahead 200F and the vehicle behind 200R are located in sensing areas of the front sensor 111 and the rear sensor 112, respectively.

The controller 130 may determine a probability of forward collision based on at least one of a relative distance, a relative speed, and a relative acceleration to those of the vehicle ahead 200F. When there is a probability of forward collision and there is a vehicle ahead 200F with no vehicle behind 200R, the controller 130 performs a basic forward collision avoiding control in which only the vehicle ahead 200F is considered. For example, the controller 130 may determine a relative distance and a relative speed of the vehicle 100 to those of the vehicle ahead 200F based on output of the front sensor 111 and the vehicle information sensor 120 and may calculate a target acceleration to avoid a collision with the vehicle ahead 200F or minimize a collision speed based on the relative distance and the relative speed of the vehicle 100 to those of the vehicle ahead 200F. Also, upon determination that a collision may be avoided by changing a driving direction of the vehicle 100, the controller 130 may control a steering angle of the steering wheel 40.

Also, upon determination that there is no probability of a rear-end collision even when there is a vehicle behind 200R, the controller 130 may perform a collision avoiding control in consideration of only the vehicle ahead 200F. For example, the controller 130 may determine at least one of a relative distance, a relative speed, and a relative acceleration of the vehicle 100 to those of the vehicle behind 200R based on output of the rear sensor 112 and the vehicle information sensor 120, and determine whether or not there is a probability of rear-end collision when the forward collision avoiding control is performed based on the determined relative distance, relative speed, or relative acceleration. Upon determination that there is no probability of rear-end collision, the controller 130 may perform a collision avoiding control by considerably only the vehicle ahead 200F as described above.

The controller 130 may generate a control signal to decelerate the vehicle 100 in accordance with the calculated target acceleration for the collision avoiding control and transmit the generated control signal to the brake module 140. The brake module 140 may generate a braking force in accordance with the received control signal to decelerate the vehicle 100.

In addition, the controller 130 may transmit an airbag deployment signal to the airbag module 150 to deploy the airbags simultaneously decelerating the vehicle 100.

The controller 130 may also output a warning to notify the user of the risk of collision through the user interface 160 simultaneously decelerating the vehicle 100.

Upon determination that there are both of the vehicle ahead 200F and the vehicle behind 200R, the controller 130 may determine a predicted collision mode based on positions and moving directions of the vehicle 100 and the vehicle ahead 200F.

For example, the collision mode may include a same direction collision mode in which the vehicle 100 collides with a vehicle ahead 200F travelling in the same direction in front of the vehicle 100 at the rear end of the vehicle ahead 200F as illustrated in FIG. 6, a head-on collision mode in which the vehicle 100 collides with a vehicle ahead 200F travelling toward the vehicle 100 as illustrated in FIG. 7, and a side collision mode in which the vehicle 100 collides with a vehicle ahead 200F at an intersection as illustrated in FIG. 8.

In addition, the head-on collision mode may be divided into a frontal collision mode, an offset collision mode, and an oblique collision mode. For example, the head-on collision mode may occur when one vehicle crossing over the centerline to overtake a preceding vehicle collides with another vehicle travelling in the opposite direction or when one vehicle turning at an intersection collides with another vehicle travelling straight.

The controller 130 determines a probability of collision with a vehicle behind 200R when decelerating to avoid collision of the vehicle 100 in a predicted collision mode. For example, the controller 130 may determine the probability of collision with the vehicle behind 200R by using a driver's behavior model and a relative distance, a relative speed, or a relative acceleration to those of the vehicle behind 200R acquired by using the rear sensor 112. Based on the driver's behavior mode, a delay time taken until the driver of the vehicle behind 200R recognizes deceleration of the vehicle 100 and then decelerates the vehicle behind 200R and a braking distance obtained by a general braking force of a driver. Also, the driver's behavior model may be generated by statistics using big data, simulations, machine learnings, experiments, and the like.

When a collision with the vehicle behind 200R is predicted, i.e., when there is a probability of collision with the vehicle behind 200R, the controller 130 determines a target forward collision speed and a target rear-end collision speed to minimize a sum of injuries caused by the collision with the vehicle ahead 200F and injuries caused by the collision with the vehicle behind 200R and calculate target acceleration/deceleration corresponding to the determined target forward collision speed and target rear-end collision speed. The acceleration is a concept including both of increasing and decreasing rates of the speed and will be used as a term including acceleration and deceleration in embodiments to be described later.

The controller 130 may also generate a control signal to decelerate the vehicle 100 in accordance with the calculated target acceleration and transmit the generated control signal to the brake module 140. The brake module 140 may decelerate the vehicle 100 by generating a braking force in accordance with the received control signal.

The controller 130 may also deploy the airbag by transmitting an airbag deployment signal to the airbag module 150 simultaneously decelerating the vehicle 100.

Also, the controller 130 may output a warning to notify the user of the risk of collision through the user interface 160 simultaneously decelerating the vehicle 100.

Hereinafter, the operation of calculating the target acceleration performed by the controller 130 will be described in more detail.

The controller 130 may acquire driver injury information by a collision with the vehicle ahead 200F (hereinafter, referred to as forward collision) and driver injury information by a collision with the vehicle behind 200R (hereinafter, referred to as rear-end collision) according to a predicted collision mode and calculate a normalized injury index (NII) by using the driver injury information. For example, the controller 130 may calculate the normalized injury index based on injury scales normalized on the basis of speed at collision. As an example of the normalized injury scales, an Abbreviated Injury Scale (AIS) may be used.

In addition, the normalized injury index may be obtained by a normalization method based on threshold defined by a law or a normalization method using overall probability of injury defined by US-NCAP and laws of the North America.

In addition, the controller 130 may determine a minimum value of the sum of injury indexes. Specifically, the controller 130 may determine a minimum value I_min of the sum of a normalized injury index NII_F by a forward collision and a normalized injury index NII_R of a rear-end collision respectively weighed by a weight a according to Equation 1 below.

$$I\_min = Min(\alpha * NII\_F + (1-\alpha) * NII\_R) \quad \text{Equation 1}$$

The controller 130 may determine a target forward collision speed and a target rear-end collision speed corresponding to the minimum value of the sum of injury indexes and calculate a target acceleration of the vehicle 100 to satisfy the determined target forward collision speed and target rear-end collision speed.

Meanwhile, the degree of injury to a body part of the driver may vary according to the collision mode. Hereinafter, the operation of calculating the target acceleration will be described in more detail based on a case where the collision mode determined by the controller 130 is the same direction collision mode.

FIGS. 9 to 12 are graphs exemplarily illustrating injury information by a forward collision applicable to a vehicle according to an embodiment. FIGS. 13 to 16 are graphs exemplarily illustrating injury information by a rear-end collision applicable to a vehicle according to an embodiment.

As described above, the controller 130 may acquire driver injury information by a collision with the vehicle ahead 200F (forward collision) and driver injury information by a collision with the vehicle behind 200R (rear-end collision).

When the collision mode determined based on output of the surrounding information detector 110 and the vehicle information sensor 120 is the same direction collision mode, injury information by a forward collision as illustrated in FIGS. 9 to 12 may be used. For example, the injury criteria may be calculated by generating injury risk curves of each body part via impact experiments for each collision mode and each subject of collision and performing data correction in which a situation at the time of an actual collision is reflected to the injury risk curve data. The injury information illustrated in FIGS. 9 to 12 indicates the calculated injury criteria.

Figure 9:
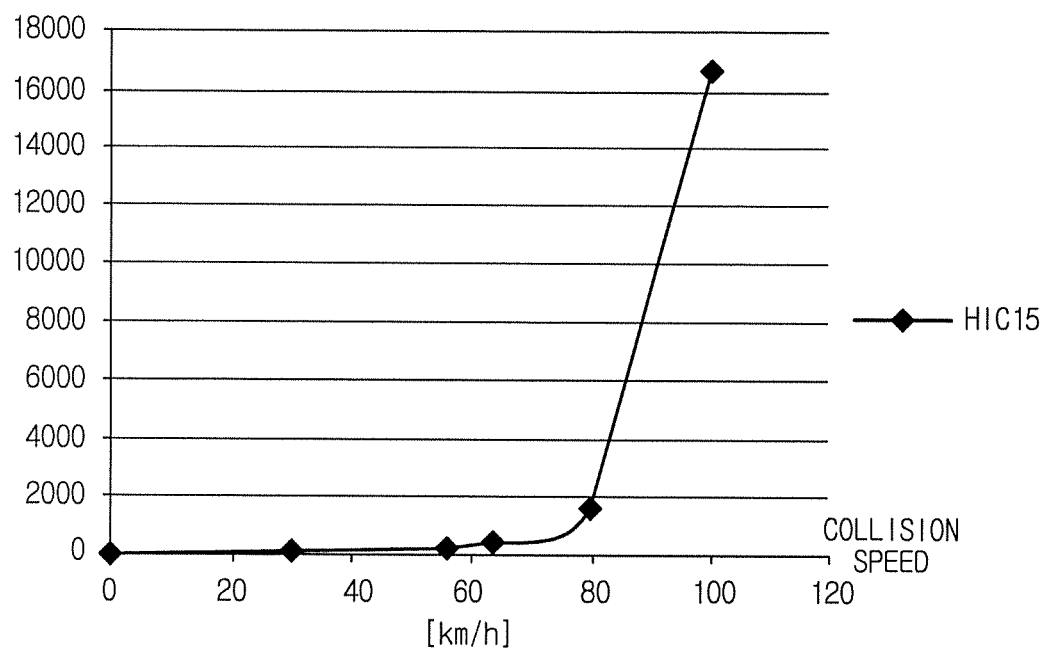
FIGS. 9 to 12 are graphs exemplarily illustrating injury information by a forward collision applicable to a vehicle according to an embodiment.
Figure 10:
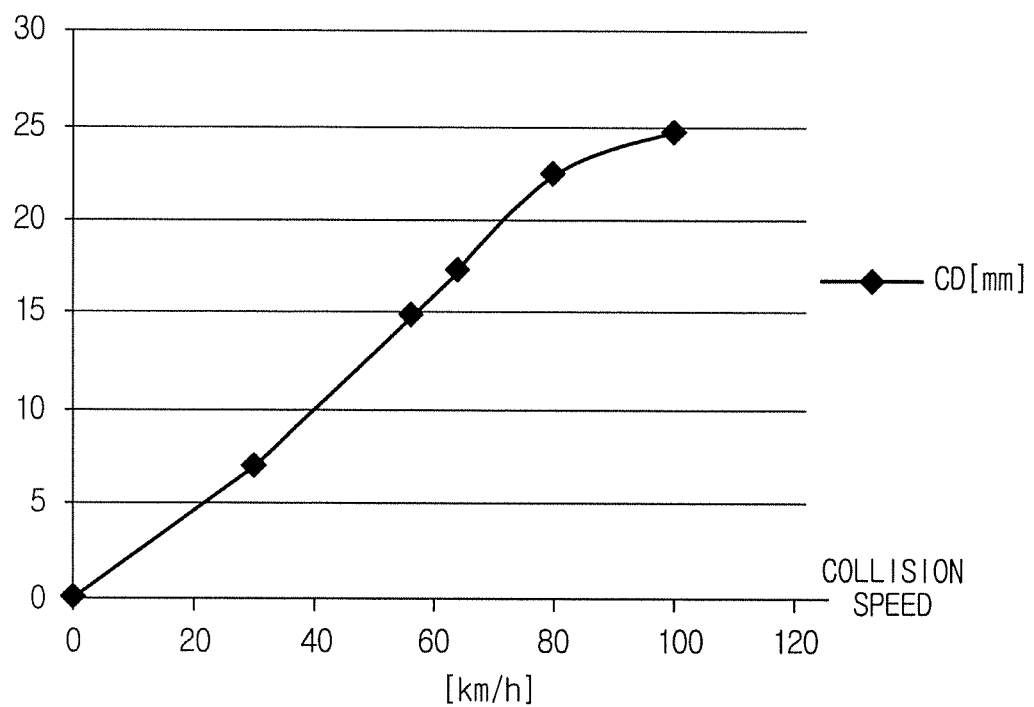
Figure 11:
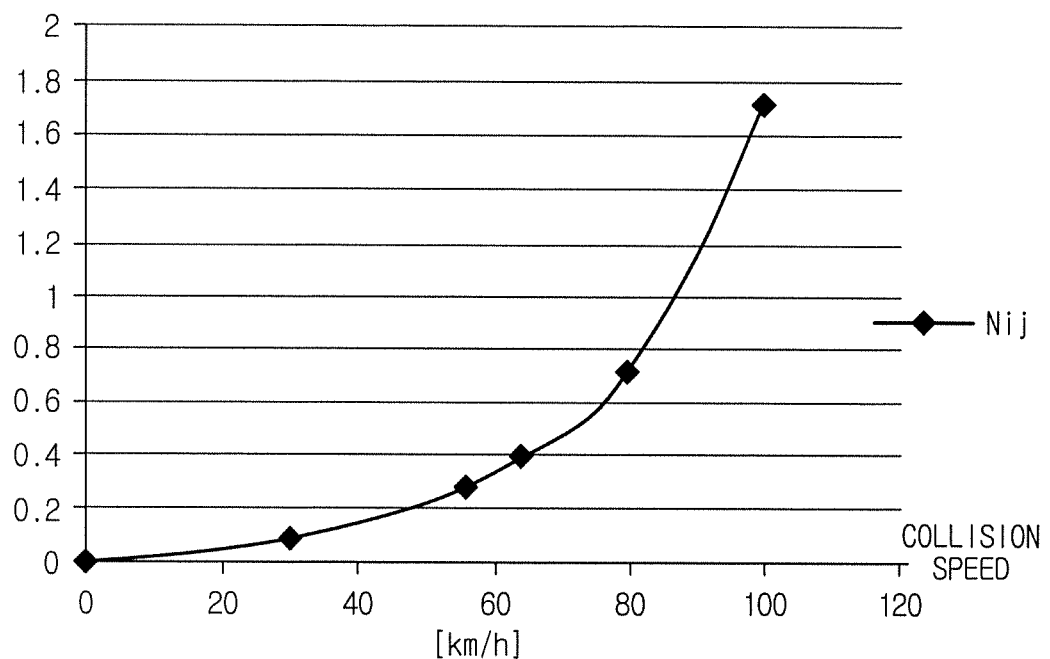
Figure 12:
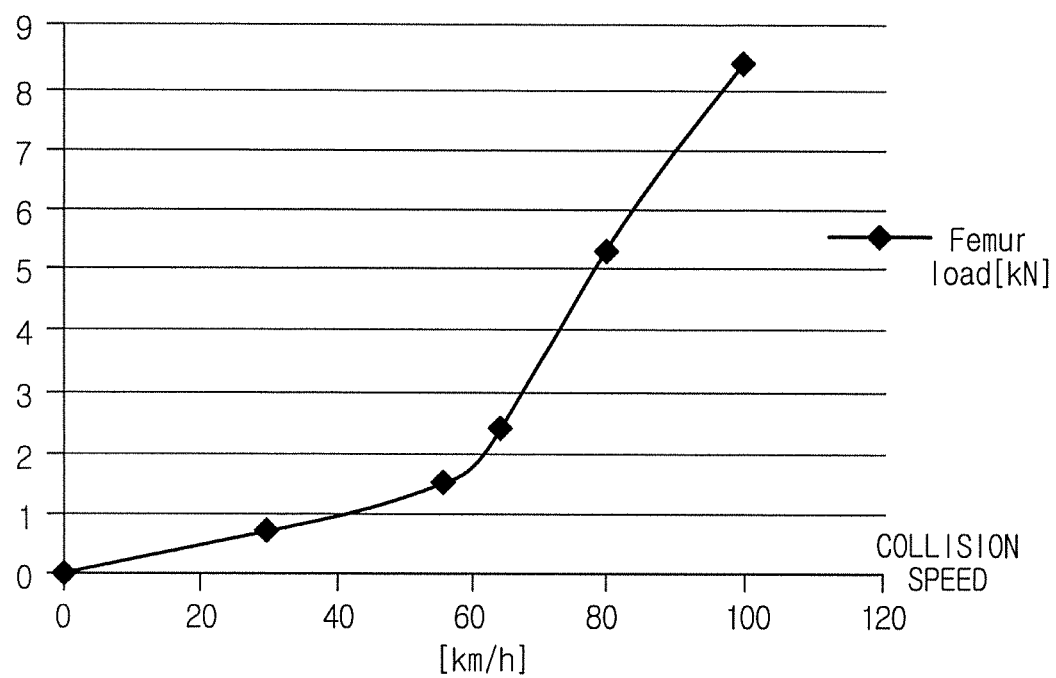

FIG. 9 is a graph exemplarily illustrating head injury criteria (HIC15) by forward collision with respect to collision speed. FIG. 10 is a graph exemplarily illustrating chest deflection (CD) by forward collision with respect to collision speed. FIG. 11 is a graph exemplarily illustrating neck injury (Nij) by forward collision with respect to collision speed. FIG. 12 is a graph exemplarily illustrating Femur load by forward collision with respect to collision speed.

Meanwhile, when the vehicle 100 is hit in the rear, the vehicle 100 accelerates forward but an occupant in the vehicle 100 maintains an initial state by inertia. In this case, although most of the impact applied to the body of the occupant is relieved or absorbed as the body hits a backrest of a seat made of an elastic material, the head of the occupant, unlike the body, is forced to move backward and is bent. Due to this sudden bending motion of the neck, whiplash injuries or strains may be caused to the neck and, in severe cases, muscles and ligaments of the neck may be broken or the cervical spine may fracture.

If there is a vehicle behind 200R following the vehicle 100 in the case where the vehicle 100 performs emergency braking to avoid a forward collision, a rear-end collision with the vehicle behind 200R may occur. In some cases, more severe injuries may be caused by the rear-end collision. Thus, the vehicle 100 may perform braking to minimize the overall injury by determining a target acceleration in consideration of not only injuries caused by the forward collision but also injuries caused by the rear-end collision.

Figure 13:
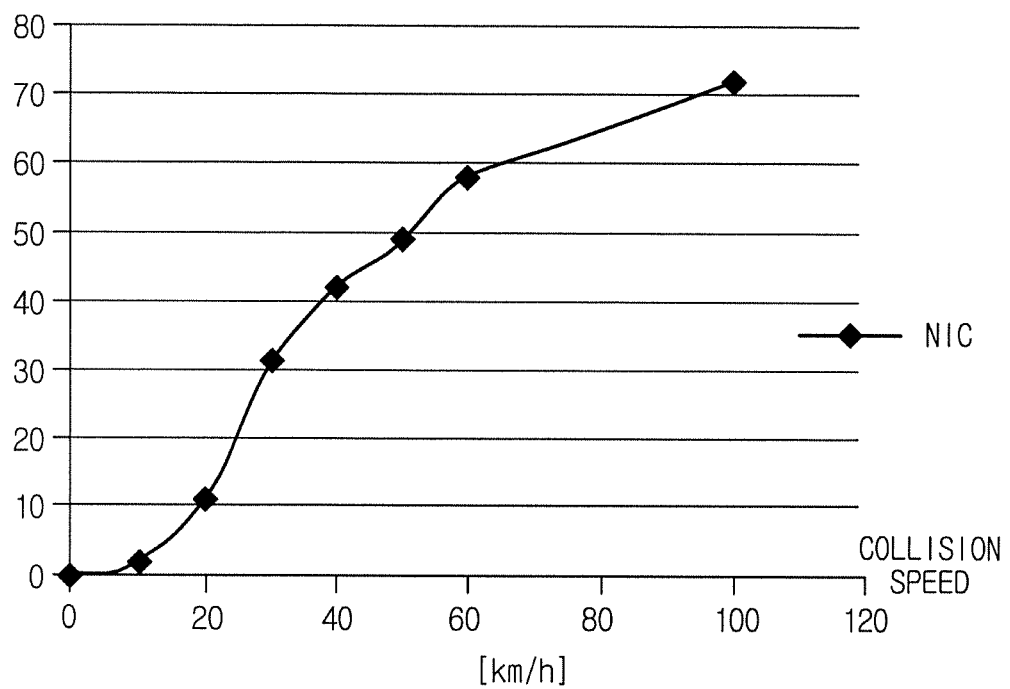
FIGS. 13 to 16 are graphs exemplarily illustrating injury information by a rear-end collision applicable to a vehicle according to an embodiment.
Figure 14:
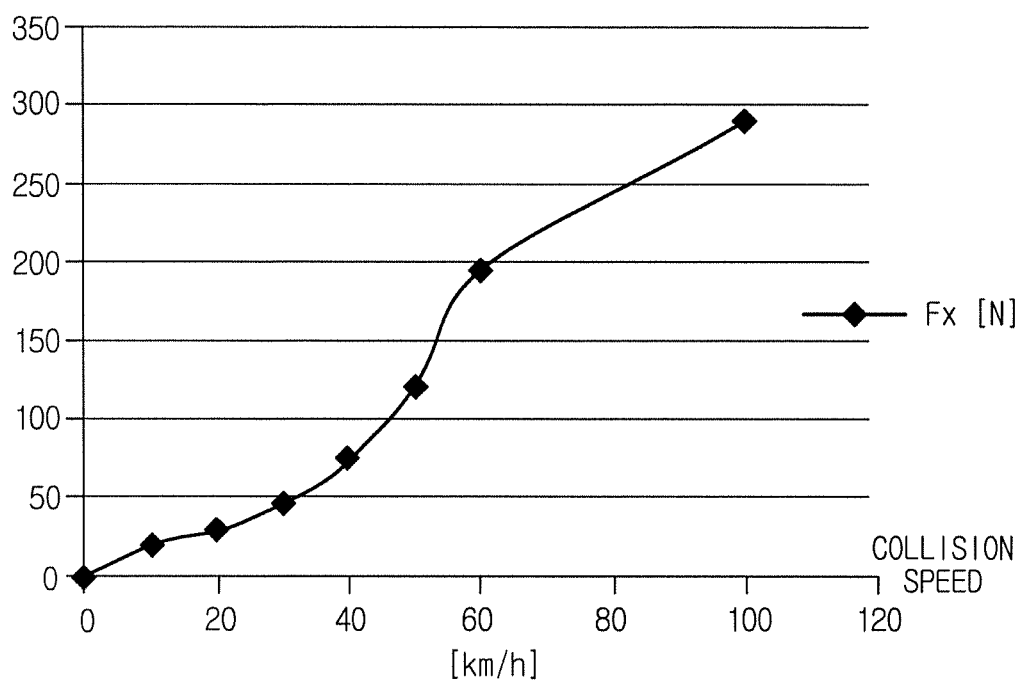
Figure 15:
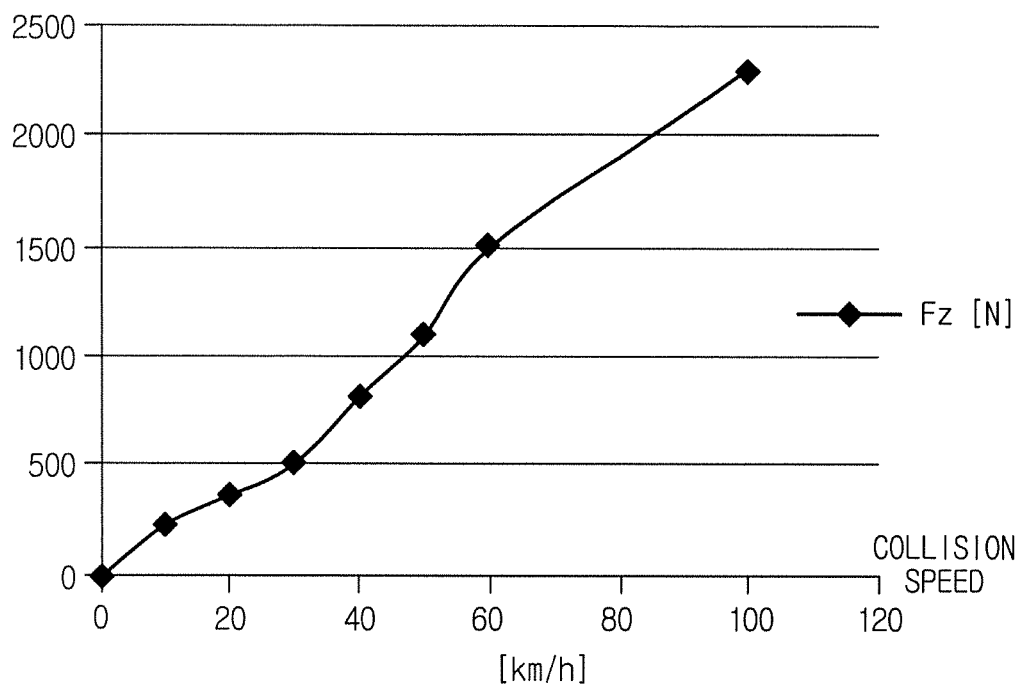
Figure 16:
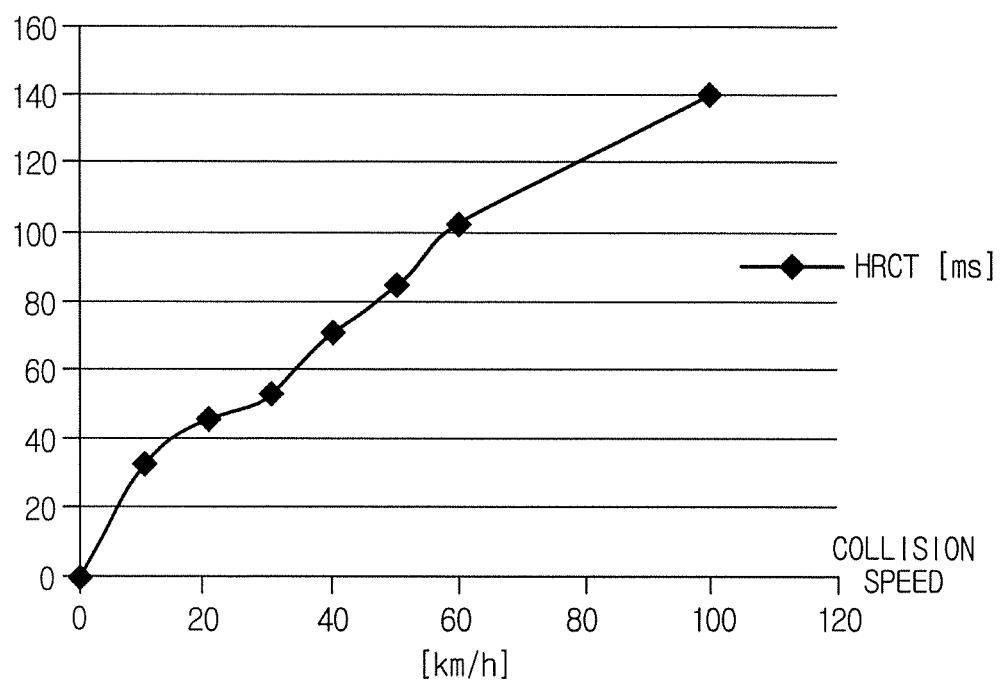

FIG. 13 is a graph illustrating neck injury criteria (NIC) by rear-end collision with respect to collision speed. FIG. 14 is a graph illustrating shearing force (Fx) of an upper portion of a neck by rear-end collision with respect to collision speed. FIG. 15 is a graph illustrating tensile force (Fz) of an upper portion of a neck by rear-end collision with respect to collision speed. FIG. 16 is a graph illustrating headrest contact time (HRCT) of a head with respect to collision speed.

The injury information illustrated in FIGS. 13 to 16 indicates injury criteria calculated by generating injury risk curves of each body part via impact experiments for each subject of collision and performing data correction in which a situation at the time of an actual collision is reflected to data of the injury risk curves.

The injury information by forward collision as shown in FIGS. 9 to 12 and the injury information by rear-end collision as shown in FIGS. 13 to 16 may be pre-stored in a memory on the basis of the collision mode or provided from an external server via a communicator provided in the vehicle 100.

Also, the injury information of the occupant may vary in accordance with specifications of a safety device provided in the vehicle 100 and the safety device provided in the vehicle 100 may be automatic or non-automatic seat belts, headrests, airbags, and the like. The vehicle 100 may pre-store injury information corresponding to specifications of the safety device provided in the vehicle 100 or receive the injury information from the external server.

As described above, the controller 130 may calculate forward a normalized injury index NII_F by using injury information by forward collision. In this case, Abbreviated Injury Score (AIS) scale that is a normalized injury scale used to calculate the normalized injury index NII_F is shown in Table 1 below.

TABLE 1

| AIS grade | Injury | Probability of death (%) |
|---|---|---|
| 1 | Minor | 0 |
| 2 | Moderate | 1-2 |
| 3 | Serious | 8-10 |
| 4 | Severe | 5-50 |
| 5 | Critical | 5-50 |
| 6 | Maximal | 100 |

In addition, the controller 130 may calculate a rear normalized injury index NII_R by using injury information by rear-end collision. The AIS scale, as a normalized injury scale, may also be used to calculate the rear normalized injury index.

As described above, the controller 130 may apply weights ($\alpha$ and $1-\alpha$) respectively to the forward normalized injury index NII_F and the rear normalized injury index NII_R according to Equation 1, acquire a sum of the injury indexes Sum(NII_F, NII_R), and calculate a minimum value I_min of the sum of the injury indexes.

The controller 130 may determine a forward collision speed and a rear-end collision speed corresponding to the minimum value of the sum of the injury indexes and calculate a target acceleration of the vehicle 100 to satisfy the determined forward collision speed and rear-end collision speed.

The controller 130 may calculate a control amount to decelerate the vehicle 100 in accordance with the calculated target acceleration and perform a braking control of the vehicle 100 based on the calculated control amount.

In addition, the controller 130 may perform the braking control in real time in a variable manner by repeatedly performing a series of operations from determination of the collision mode to calculation of the control amount for deceleration.

The example described above relates to the same direction collision mode in which a collision with the vehicle ahead 200F and the vehicle behind 200R, which are travelling in the same direction as the vehicle 100, is predicted. However, the series of operations including calculating the normalized injury indexes by using injury information and calculating a target acceleration corresponding to a minimum value of the sum of the normalized injury indexes are the same as those described above in any other collision mode except that injury information of the occupant varies.

Hereinafter, a method of controlling a vehicle will be described. The vehicle 100 according to the aforementioned embodiment may be used to perform the method of controlling a vehicle. Thus, descriptions given above with reference to FIGS. 1 to 16 may also be applied to the embodiment of the method of controlling the vehicle.

Figure 17:
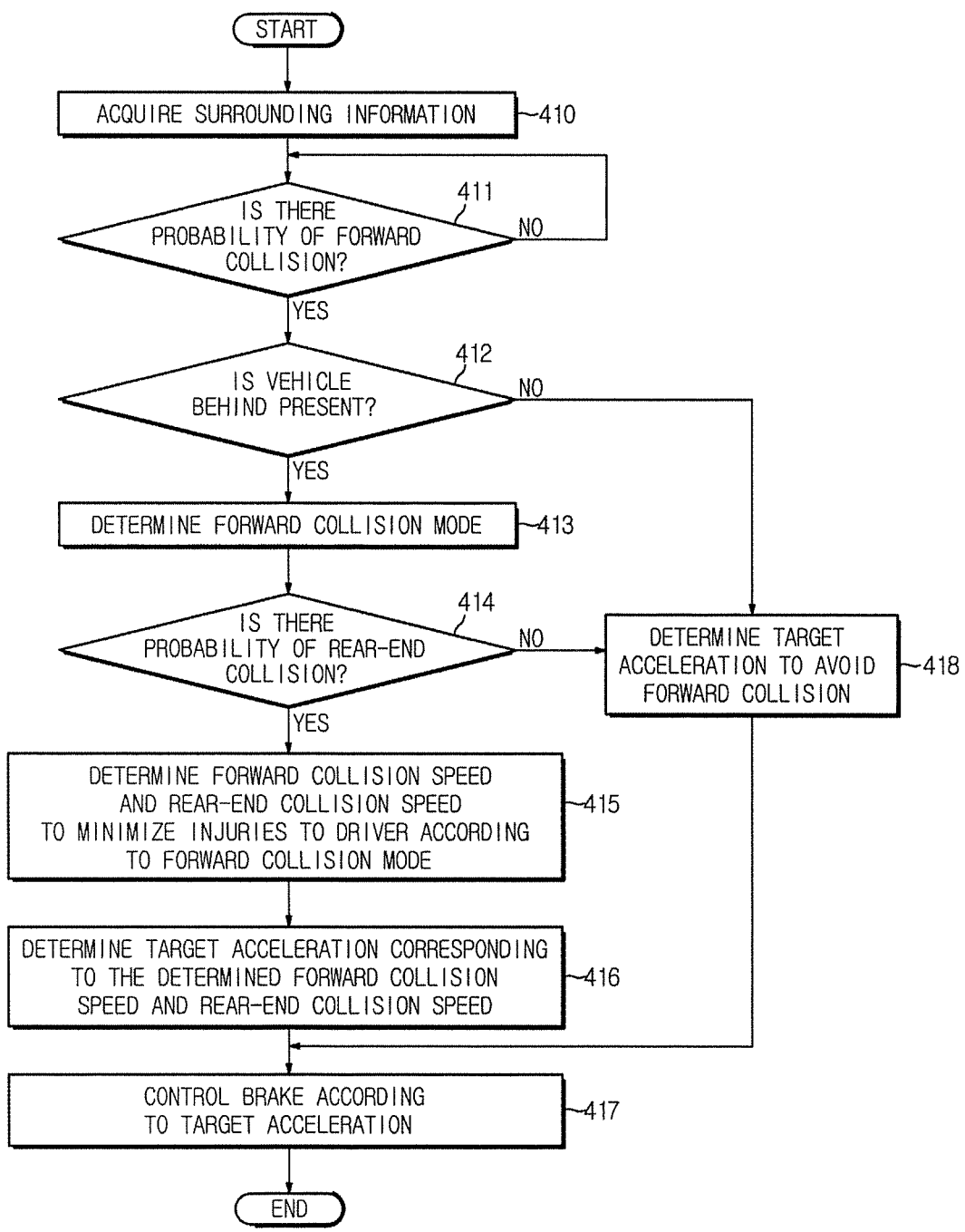
FIG. 17 is a flowchart for describing a method of controlling a vehicle according to an embodiment.

FIG. 17 is a flowchart for describing a method of controlling a vehicle according to an embodiment.

According to the method of controlling the vehicle illustrated in FIG. 17, first, surrounding information of the vehicle 100 is acquired (410). The front sensor 111 or the rear sensor 112 provided in the vehicle 100 may acquire a position, speed, acceleration, or the like of an object present around the vehicle 100 in real time. In this embodiment, a case in which another vehicle is located around the vehicle 100 will be described by way of example.

A probability of forward collision is judged (411). Specifically, when output of the front sensor 111 indicates that the vehicle ahead 200F is present in front of the vehicle 100, the controller 130 may determine a probability of collision with the vehicle ahead 200F based on a relative distance, a relative speed, or a relative acceleration of the vehicle 100 to those of the vehicle ahead 200F.

Upon determination that there is a probability of forward collision (Yes of 411), the presence of the vehicle behind is identified (412). The presence of the vehicle behind may be identified based on output of the rear sensor 112.

When there is the vehicle behind ('Yes' of 412), a forward collision mode is determined (413). Particularly, the controller 130 may determine positions and moving directions of the vehicle 100 and the vehicle ahead 200F based on the output of the front sensor 111 and the vehicle information sensor 120 and determine that a current collision mode of the vehicle 100 is a same direction collision mode, a head-on collision mode, or a side collision mode based on the positions and moving directions of the vehicle 100 and the vehicle ahead 200F.

A probability of a rear-end collision is judged (414). Particularly, the controller 130 may determine that there is no probability of rear-end collision even when the vehicle behind 200R is present as a result of determination that a collision avoiding control to avoid a forward collision does not cause a collision with the vehicle behind 200R in consideration of the relative distance, the relative speed, or the relative acceleration of the vehicle 100 to those of the vehicle behind 200R.

Upon determination that there is a rear-end collision ('Yes' of 414), a forward collision speed and a rear-end collision speed to minimize injuries to the driver are determined in accordance with the collision mode (415). For example, the controller 130 may determine a target forward collision speed and a target rear-end collision speed to minimize the sum of injuries predicted by the collision with the vehicle ahead 200F and injuries predicted by the collision with the vehicle behind 200R.

A target acceleration corresponding to the determined target forward collision speed and target rear-end collision speed is determined (416). The controller 130 may calculate the target acceleration based on a current speed of the vehicle 100.

A braking control is performed according to the target acceleration (417). Particularly, the controller 130 may generate a control signal to decelerate the vehicle 100 according to the calculated target acceleration and transmit the generated control signal to the brake module 140. The brake module 140 may decelerate the vehicle 100 by generating a braking force according to the received control signal.

A variable braking control may be performed in real time by repeatedly performing a series of operations from determinate of the collision mode to calculation of the control amount for deceleration.

In addition, the controller 130 may deploy airbags by transmitting an airbag deployment signal to the airbag module 150 simultaneously decelerating the vehicle 100.

Also, the controller 130 may output a warning to notify the user of the risk of collision via the user interface 160 simultaneously decelerating the vehicle 100.

In addition, upon determination that there is no probability of a rear-end collision based on the result of determination whether or not there is a probability of the rear-end collision (No' or 414), the target acceleration to avoid a forward collision may be determined (418) and a braking control may be performed in accordance with the target acceleration (417). In addition, even when there no vehicle behind ('No' of 412), a target acceleration to avoid a forward collision may be determined (418) and a braking control may be performed in accordance with the target acceleration (417).

The target acceleration to avoid the forward collision may be determined by a general collision avoiding control in consideration of only the vehicle ahead 200F. Specifically, the controller 130 may determine a relative distance and a relative speed of the vehicle 100 to those of the vehicle ahead 200F based on the output of the front sensor 111 and the vehicle information sensor 120 and calculate an acceleration to avoid a collision with the vehicle ahead 200F or to minimize a collision speed based on the determined relative distance and relative speed of the vehicle 100 to those of the vehicle ahead 200F. If required, a steering control of the steering wheel may be performed simultaneously.

Figure 18:
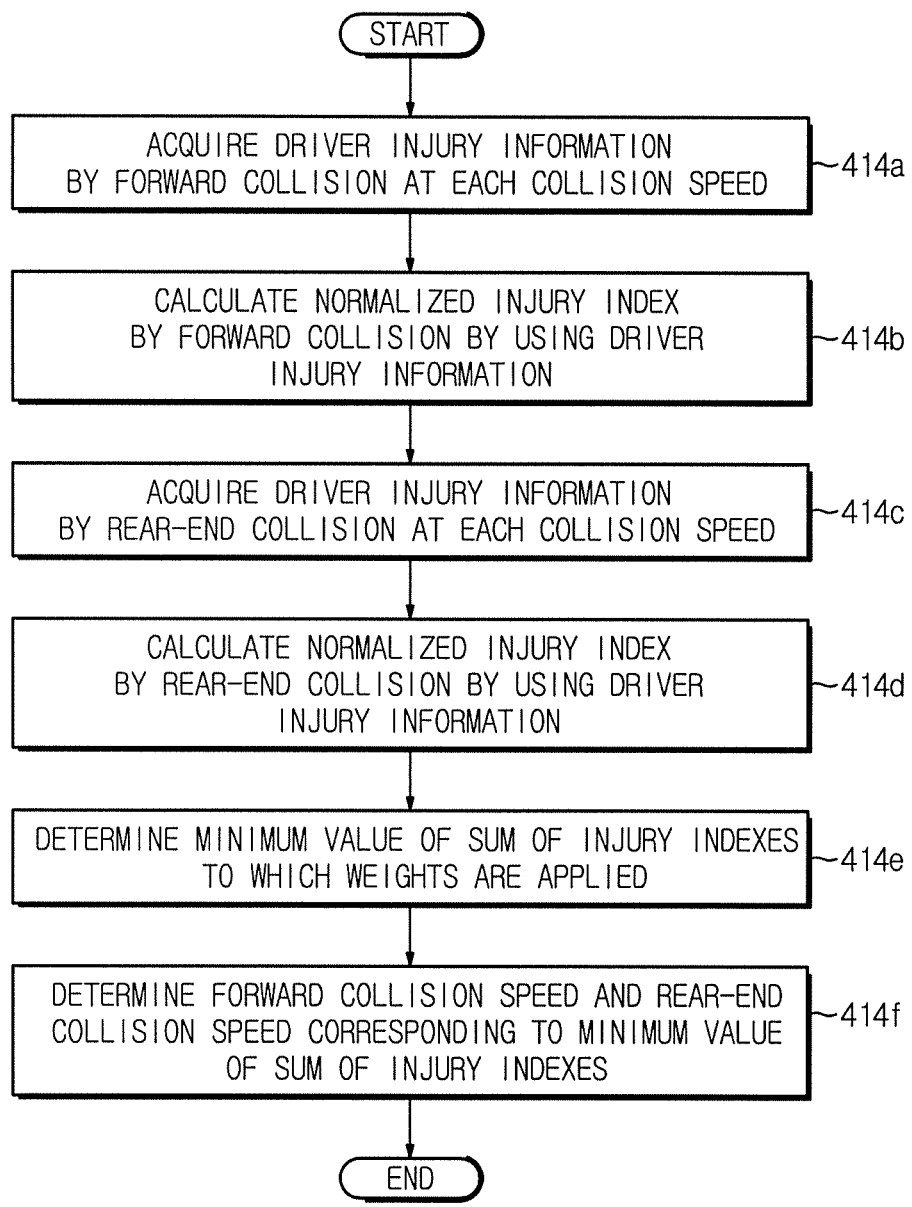
FIG. 18 is a flowchart for exemplarily describing a method of determining a target forward collision speed and a target rear-end collision speed to minimize injuries in the method of controlling a vehicle according to an embodiment.

FIG. 18 is a flowchart for exemplarily describing a method of determining a target forward collision speed and a target rear-end collision speed to minimize injuries in the method of controlling a vehicle according to an embodiment.

Referring to FIG. 18, driver injury information at the time of a forward collision with respect to each collision speed is acquired (414a). Injury criteria may be calculated based on injury risk curves generated for each body part via kinematics and dynamics analysis for each subject of experiment through collision experiments. The driver injury information may include injury criteria calculated on the basis of collision speed. In addition, the driver injury information may vary according to collision and safety specifications of the vehicle 100. Thus, the controller 130 may acquire driver injury information corresponding to the determined current collision mode and safety specifications of the vehicle 100. The driver injury information may be pre-stored in a memory provided in the vehicle 100 or the controller 130 may receive the driver injury information from an external server via a communicator provided in the vehicle 100.

A normalized injury index by forward collision is calculated by using the driver injury information (414b). A normalized injury scale, for example, the AIS scale described above in Table 1, may be used to calculate the normalized injury index NII_F by forward collision.

Driver injury information at the time of rear-end collision with respect to collision speed is acquired (414c). Injuries to the driver by rear-end collision are different from injuries to the driver by forward collision. The driver injury information by the rear-end collision may also include injury criteria calculated for each collision speed in the same manner as the driver injury information by the forward collision. Also, the driver injury information may be pre-stored in a memory provided in the vehicle 100 or the controller 130 may receive the driver injury information from an external server via a communicator provided in the vehicle 100 if required.

A normalized injury index by rear-end collision is calculated by using the driver injury information (414d). The normalized injury scale may also be used to calculate the normalized injury index NII_R by the rear-end collision.

A minimum value of the sum of injury indexes to which weights are applied (414e). The controller 130 may apply weights ($\alpha$ and $1-\alpha$) respectively to the forward normalized injury index NII_F by the forward collision and the rear normalized injury index NII_R by the rear-end collision according to Equation 1, acquire a sum of the injury indexes Sum (NII_F, NII_R), and calculate a minimum value I_min of the sum of the injury indexes.

A forward collision speed and a rear-end collision speed corresponding to the minimum value of the sum of the injury indexes are determined (414f).

According to the vehicle and the method of controlling the vehicle described above, safety of the vehicle may be improved when performing emergency braking to avoid collision with a vehicle ahead by minimizing injuries to occupants by determining a target acceleration in consideration of both of injuries caused by forward collision and injuries caused by rear-end collision at the time of the emergency braking.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A vehicle comprising:
 a surrounding information detector for detecting at least one of a position and a speed of an object around the vehicle, the object around the vehicle comprising a first vehicle ahead of the vehicle and a second vehicle behind the vehicle;

a vehicle information sensor for detecting at least one of a speed and an acceleration of the vehicle; and a controller configured to:
  determine a probability of a forward collision with the first vehicle and a probability of a rear-end collision with the second vehicle based on outputted information of the surrounding information detector and the vehicle information sensor,
  determine one of a plurality of collision modes as a collision mode of the vehicle in response to determining the probability of the forward collision with the first vehicle,
  determine the probability of the rear-end collision with the second vehicle also based on determination of whether a control to avoid the forward collision with the first vehicle in the collision mode cause a collision with the second vehicle,
  determine a target forward collision speed and a target rear-end collision speed to minimize a sum of injuries to an occupant of the vehicle by the forward collision and injuries to the occupant by the rear-end collision, based on the collision mode and a pre-stored injury scale corresponding to the collision mode, in response to a determination that there are the probabilities of the forward collision and the rear-end collision, and
  control braking of the vehicle based on the target forward collision speed and the target rear-end collision speed.

2. The vehicle of claim 1, wherein the controller determines the collision mode based on positions and moving directions of the vehicle and the first vehicle upon determination that there is a probability of a forward collision.

3. The vehicle of claim 2, wherein the collision mode comprises at least one of a same direction collision mode in which the vehicle collides with the first vehicle travelling in the same direction at the rear of the first vehicle, a head-on collision mode in which the vehicle collides with the first vehicle travelling toward the vehicle, and a side collision mode in which the vehicle collides with the first vehicle at an intersection.

4. The vehicle of claim 1, wherein the controller acquires injury information by the forward collision indicating injuries to the occupant by the forward collision and injury information by the rear-end collision indicating injuries to the occupant by the rear-end collision.

5. The vehicle of claim 4, wherein the acquired injury information by the forward collision comprises injury criteria calculated for the forward collision with respect to collision speed of the vehicle, and the acquired injury information by the rear-end collision comprises injury criteria calculated for the rear-end collision with respect to collision speed of the vehicle.

6. The vehicle of claim 4, wherein the controller calculates a normalized injury index for the forward collision by using the acquired injury information by the forward collision and calculates a normalized injury index for the rear-end collision by using the acquired injury information by the rear-end collision.

7. The vehicle of claim 6, wherein the controller determines a minimum value of a sum of the normalized injury index calculated for the forward collision and the normalized injury index calculated for the rear-end collision.

8. The vehicle of claim 7, wherein the controller determines a target forward collision speed and a target rear-end collision speed corresponding to the determined minimum value of the sum of the normalized injury index calculated for the forward collision and the normalized injury index calculated for the rear-end collision.

9. The vehicle of claim 8, wherein the controller determines a target acceleration satisfying the target forward collision speed and the target rear-end collision speed.

10. The vehicle of claim 9, wherein the controller calculates a control amount to decelerate the vehicle in accordance with the target acceleration, generates a control signal based on the calculated control amount, and controls braking of the vehicle based on the generated control signal.

11. The vehicle of claim 1, wherein the controller acquires injury information by the forward collision and injury information by the rear-end collision based on a safety device provided in the vehicle.

12. A method of controlling a vehicle, the method comprising:
  detecting at least one of a position and a speed of an object around the vehicle comprising a first vehicle ahead of the vehicle and a second vehicle behind the vehicle;
  detecting at least one of a speed and an acceleration of the vehicle;
  determining a probability of a forward collision with the first vehicle and a probability of a rear-end collision with the second vehicle based on the at least one of the position and the speed of the object and the at least one of the speed and the acceleration of the vehicle;
  determining one of a plurality of collision modes as a collision mode of the vehicle in response to determining the probability of the forward collision with the first vehicle;
  determining the probability of the rear-end collision with the second vehicle also based on determination of whether a control to avoid the forward collision with the first vehicle in the collision mode causes a collision with the second vehicle;
  determining a target forward collision speed and a target rear-end collision speed to minimize a sum of injuries of an occupant of the vehicle by the forward collision and injuries to the occupant by the rear-end collision upon determination that there are the probabilities of the forward collision and the rear-end collision, based on the collision mode and a pre-stored injury scale corresponding to the collision mode; and
  performing a braking control of the vehicle based on the target forward collision speed and the target rear-end collision speed.

13. The method of claim 12, wherein the determining of the probabilities of the forward collision and the rear-end collision further comprises determining a collision mode based on positions and moving directions of the vehicle and the first vehicle upon determination that there is a probability of a forward collision.

14. The method of claim 13, wherein the collision mode comprises at least one of a same direction collision mode in which the vehicle collides with the first vehicle travelling in the same direction at the rear of the first vehicle, a head-on collision mode in which the vehicle collides with the first vehicle travelling toward the vehicle, and a side collision mode in which the vehicle collides with the first vehicle at an intersection.

15. The method of claim 12, wherein the determining of the target forward collision speed and the target rear-end collision speed comprises acquiring injury information by the forward collision indicating injuries to the occupant by the forward collision and injury information by the rear-end collision indicating injuries to the occupant by the rear-end collision.

16. The method of claim 15, wherein the acquired injury information by the forward collision comprises injury criteria calculated for the forward collision with respect to collision speed of the vehicle, and the acquired injury information by the rear-end collision comprises injury criteria calculated for the rear-end collision with respect to collision speed of the vehicle.

17. The method of claim 15, wherein the determining of the target forward collision speed and the target rear-end collision speed further comprises calculating a normalized injury index for the forward collision by using the acquired injury information by the forward collision and calculating a normalized injury index for the rear-end collision by using the acquired injury information by the rear-end collision.

18. The method of claim 17, wherein the determining of the target forward collision speed and the target rear-end collision speed further comprises determining a minimum value of a sum of the normalized injury index calculated for the forward collision and the normalized injury index calculated for the rear-end collision.

19. The method of claim 17, wherein the determining of the target forward collision speed and the target rear-end collision speed further comprises determining a target forward collision speed and a target rear-end collision speed corresponding to the determined minimum value of the sum of the normalized injury index calculated for the forward collision and the normalized injury index calculated for the rear-end collision.

20. The method of claim 19, wherein the performing of a braking control of the vehicle comprises determining a target acceleration satisfying the target forward collision speed and the target rear-end collision speed.

21. The method of claim 20, wherein the performing of a braking control of the vehicle comprises calculating a control amount to decelerate the vehicle in accordance with the target acceleration, generating a control signal based on the calculated control amount, and performing the braking control of the vehicle based on the generated control signal.

* * * * *